United States Patent
Sakhinana et al.

(10) Patent No.: US 12,437,845 B2
(45) Date of Patent: Oct. 7, 2025

(54) EDGE CONDITIONED DYNAMIC NEIGHBORHOOD AGGREGATION BASED MOLECULAR PROPERTY PREDICTION

(71) Applicant: Tata Consultancy Services Limited, Mumbai (IN)

(72) Inventors: Sagar Srinivas Sakhinana, Pune (IN); Venkata Sudheendra Buddhiraju, Pune (IN); Sri Harsha Nistala, Pune (IN); Venkataramana Runkana, Pune (IN)

(73) Assignee: Tata Consultancy Services Limited, Mumbai (IN)

(*) Notice: Subject to any disclaimer, the term of this patent is extended or adjusted under 35 U.S.C. 154(b) by 805 days.

(21) Appl. No.: 17/804,262

(22) Filed: May 26, 2022

(65) Prior Publication Data

US 2023/0116680 A1    Apr. 13, 2023

(30) Foreign Application Priority Data

Oct. 11, 2021   (IN) .............................. 202121046237

(51) Int. Cl.
  *G16C 10/00*   (2019.01)
  *G06F 17/16*   (2006.01)
  (Continued)

(52) U.S. Cl.
  CPC ............. *G16C 10/00* (2019.02); *G06F 17/16* (2013.01); *G06N 3/048* (2023.01); *G06N 3/063* (2013.01);
  (Continued)

(58) Field of Classification Search
  USPC .......................................................... 702/22
  See application file for complete search history.

(56) References Cited

U.S. PATENT DOCUMENTS

2020/0372355 A1\* 11/2020 Tarlow ..................... G06N 3/08
2021/0287067 A1\*  9/2021 Zavoronkovs ......... G06N 3/044
(Continued)

FOREIGN PATENT DOCUMENTS

CN    111462088 A    7/2020
CN    111465944 A    7/2020
(Continued)

OTHER PUBLICATIONS

Gabriele Corso et al., "Principal Neighbourhood Aggregation for Graph Nets," Machine Learning, Dec. 2020, Arxiv, https://arxiv.org/pdf/2004.05718.pdf.
Matthias Fey, "Dynamic Neighborhood Aggregation in Graph Neural Networks," Methods, Apr. 2019, Arxiv, https://arxiv.org/pdf/1904.04849.pdf.
(Continued)

*Primary Examiner* — Paul D Lee
(74) *Attorney, Agent, or Firm* — Finnegan, Henderson, Farabow, Garrett & Dunner, LLP

(57) ABSTRACT

This disclosure relates generally to system and method for molecular property prediction. The conventional methods for molecular property prediction suffer from inherent limitation to effectively encapsulate the characteristics of the molecular graph. Moreover, the known methods are computationally intensive, thereby leading to non-performance in real-time scenarios. The disclosed method overcomes the limitations of typical dynamic neighborhood aggregation (DNA) method by fusing the static edge attributes in determining the self-attention coefficients. In an embodiment, the disclosed method transforms the hidden state of a sink node by utilizing a neural-net function, which takes as input an aggregated single-message vector obtained by the self-attention mechanism and the self-attention mechanism transformed hidden state of the node.

18 Claims, 6 Drawing Sheets

(51) Int. Cl.
*G06N 3/048* (2023.01)
*G06N 3/063* (2023.01)
*G06N 3/08* (2023.01)
*G16C 20/30* (2019.01)
*G16C 20/70* (2019.01)

(52) U.S. Cl.
CPC .............. *G06N 3/08* (2013.01); *G16C 20/30* (2019.02); *G16C 20/70* (2019.02)

(56) References Cited

U.S. PATENT DOCUMENTS

| | | | | |
|---|---|---|---|---|
| 2021/0383228 | A1* | 12/2021 | Velickovic | .......... G06F 16/2379 |
| 2022/0180201 | A1* | 6/2022 | Sarshogh | ............... G06N 3/084 |
| 2022/0318596 | A1* | 10/2022 | Sarshogh | ............... G16C 20/70 |
| 2022/0328141 | A1* | 10/2022 | Gedeck | ................ G06N 3/0464 |
| 2022/0383074 | A1* | 12/2022 | Strathmann | .............. G06N 3/09 |

FOREIGN PATENT DOCUMENTS

| | | | |
|---|---|---|---|
| CN | 113140267 A | 7/2021 | |
| CN | 112435720 A | 10/2021 | |

OTHER PUBLICATIONS

Xinhan Di, "Neighborhood Enlargement in Graph Neural Networks," Machine Learning, May 2019, Arxiv, https://arxiv.org/pdf/1905.08509v1.pdf.

Jie Zhou et al., "Graph neural networks: A review of methods and applications," Machine Learning, 2021, Arxiv, https://arxiv.org/ftp/arxiv/papers/1812/1812.08434.pdf.

Fenyuhua et al., "GraphAIR: Graph representation learning with neighborhood aggregation and interaction," Machine Learning, Nov. 2020, Arxiv, https://arxiv.org/pdf/1911.01731.pdf.

Si Zhang et al., "Graph convolutional networks: a comprehensive review," Computational Social Networks, Nov. 2019, Springer, https://computationalsocialnetworks.springeropen.com/track/pdf/10.1186/s40649-019-0069-y.pdf.

Jun Chen et al., "Edge-Featured Graph Attention Network," Artificial Intelligence, Jan. 2021, Arxiv, https://arxiv.org/pdf/2101.07671.pdf.

Anuraj Mohan et al., "Temporal network embedding using graph attention network," Complex & Intelligent Systems, Mar. 2021, Springer, https://link.springer.com/content/pdf/10.1007/s40747-021-00332-x.pdf.

* cited by examiner

```
┌─────────────────────────────────────────────────┐
│ ACCESS A DATABASE COMPRISING A PLURALITY OF     │
│ MOLECULAR GRAPHS ASSOCIATED WITH A PLURALITY    │
│ OF MOLECULES AND A PLURALITY OF LABELS          │
│ INDICATIVE OF CHEMICAL PROPERTIES OF THE        │─ 302
│ PLURALITY OF THE MOLECULAR GRAPHS, WHEREIN EACH │
│ MOLECULAR GRAPH OF THE PLURALITY OF MOLECULAR   │
│ GRAPHS COMPRISES A PLURALITY OF SINK NODES,     │
│ EACH SINK NODE OF THE PLURALITY OF SINK NODES   │
│ CONNECTED TO A PLURALITY OF SOURCE NODES FOR    │
│ PASSING NEURAL MESSAGES THROUGH A PLURALITY     │
│ OF CONNECTING EDGES                             │
└─────────────────────────────────────────────────┘
                         ▼
┌─────────────────────────────────────────────────┐
│ UPDATE HIDDEN STATES OF THE PLURALITY OF NODES  │
│ OF EACH MOLECULAR GRAPH BY AGGREGATING ENCODED  │
│ NEURAL MESSAGES FROM THE PLURALITY OF SINK      │
│ NODES ASSOCIATED WITH EACH MOLECULAR GRAPH TO   │
│ TRANSFORM THE HIDDEN REPRESENTATION OF EACH     │
│ SINK NODE FROM AMONGST THE PLURALITY OF SINK    │
│ NODES IN A PLURALITY OF ITERATIONS              │
│  ┌───────────────────────────────────────────┐  │
│  │ DETERMINE A FIRST KEY MATRIX              │  │
│  │ REPRESENTATIVE OF A PLURALITY OF EDGE-    │  │
│  │ INCORPORATED NEURAL MESSAGES SENT BY THE  │─ 306
│  │ PLURALITY OF SOURCE NODES TO THE SINK     │  │
│  │ NODE IN A SET OF PREVIOUS ITERATIONS      │  │
│  │ OCCURRED PRIOR TO THE CURRENT ITERATION   │  │
│  └───────────────────────────────────────────┘  │
│                      ▼                          │
│  ┌───────────────────────────────────────────┐  │
│  │ DETERMINE A FIRST VALUE MATRIX            │  │
│  │ REPRESENTATIVE OF THE PLURALITY OF EDGE-  │─ 308
│  │ INCORPORATED NEURAL MESSAGES SENT BY THE  │  │─ 304
│  │ PLURALITY OF SOURCE NODES TO THE SINK     │  │
│  │ NODE IN THE SET OF PREVIOUS ITERATIONS    │  │
│  └───────────────────────────────────────────┘  │
│                      ▼                          │
│  ┌───────────────────────────────────────────┐  │
│  │ DETERMINE A FIRST QUERY MATRIX            │─ 310
│  │ REPRESENTATIVE OF LINEARLY TRANSFORMED    │  │
│  │ HIDDEN STATE OF THE SINK NODE             │  │
│  └───────────────────────────────────────────┘  │
│                      ▼                          │
│  ┌───────────────────────────────────────────┐  │
│  │ DETERMINE A FIRST SET OF SELF-ATTENTION   │  │
│  │ COEFFICIENTS TO GIVE WEIGHTAGE TO THE     │  │
│  │ PLURALITY OF EDGE-INCORPORATED NEURAL     │  │
│  │ MESSAGES SENT FROM PLURALITY OF SOURCE    │─ 312
│  │ NODES, THE FIRST SET OF SELF-ATTENTION    │  │
│  │ COEFFICIENTS DETERMINED AS A SOFTMAX      │  │
│  │ TRANSFORM PRODUCT OF FIRST QUERY MATRIX   │  │
│  │ AND THE FIRST KEY MATRIX                  │  │
│  └───────────────────────────────────────────┘  │
│                      ▼                          │
│  ┌───────────────────────────────────────────┐  │
│  │ CALCULATE A SINGLE MESSAGE VECTOR TO BE   │  │
│  │ PERCEIVED BY THE SINK NODE BASED ON A     │  │
│  │ MATRIX MULTIPLICATION OF THE FIRST VALUE  │─ 314
│  │ MATRIX AND THE FIRST SET OF SELF-         │  │
│  │ ATTENTION COEFFICIENTS, WHEREIN THE       │  │
│  │ SINGLE MESSAGE VECTOR DETERMINES THE      │  │
│  │ HIDDEN STATE OF THE SINK NODE IN A NEXT   │  │
│  │ ITERATION OCCURRING SUBSEQUENT TO THE     │  │
│  │ CURRENT ITERATION                         │  │
│  └───────────────────────────────────────────┘  │
└─────────────────────────────────────────────────┘
```

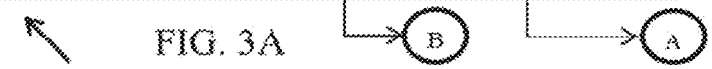

EDGE CONDITIONED DYNAMIC NEIGHBORHOOD AGGREGATION BASED MOLECULAR PROPERTY PREDICTION

PRIORITY CLAIM

This U.S. patent application claims priority under 35 U.S.C. § 119 to: India Application No. 202121046237, filed on Oct. 11, 2021. The entire contents of the aforementioned application are incorporated herein by reference.

TECHNICAL FIELD

This disclosure relates generally to the field of molecular property prediction, and more particularly to system and method for molecular property prediction using edge conditioned dynamic neighborhood aggregation.

BACKGROUND

Machine learning technique, in specific, supervised learning on drug-like potential molecules has remarkable applications for use in more effective drug discovery. It provides substantial prospects in diminishing the computational complexity which is a key desideratum for prognostication of molecular properties and aid in billion price tag cost reduction of developing a potential drug for treatment.

Message Passing Neural Networks (MPNN's) are non-spectral approach of performing convolution on unstructured molecular graphs. It is a graph-based property prediction framework. It leverages a message passing algorithm and a set-pooling aggregation operator to derive a graph-level representation of the complete input low treewidth chemical graphs to assist in inductive learning tasks. The MPNN's however suffer from inherent limitation to effectively encapsulate the characteristics of the molecular graph. Moreover, due to its high computational complexity, MPNN in not viable for real-time property prediction.

SUMMARY

Embodiments of the present disclosure present technological improvements as solutions to one or more of the above-mentioned technical problems recognized by the inventors in conventional systems. For example, in one embodiment, a processor-implemented method for molecular property prediction using edge conditioned dynamic neighborhood aggregation mechanism is provided. The method includes accessing, via one or more hardware processors, a database comprising a plurality of molecular graphs associated with a plurality of molecules and a plurality of labels indicative of chemical properties of the plurality of the molecular graphs, wherein each molecular graph of the plurality of molecular graphs comprises a plurality of sink nodes, each sink node of the plurality of sink nodes connected to a plurality of source nodes for passing neural messages through a plurality of edges. Further, the method includes updating, via the one or more hardware processors, hidden states of the plurality of nodes of each molecular graph from amounts the plurality of molecular graphs by aggregating encoded neural messages from the plurality of sink nodes associated with each of the molecular graphs to transform the hidden representation of each sink node from amongst the plurality of sink nodes in a plurality of iterations, wherein transforming the hidden state of a sink node from amongst the plurality of sink nodes in a current iteration from amongst the plurality of iterations comprises determining a first key matrix representative of a plurality of edge-incorporated neural messages sent by the plurality of source nodes to the sink node in a set of previous iterations occurred prior to the current iteration, determining a first value matrix representative of the plurality of edge-incorporated neural messages sent by the plurality of source nodes to the sink node in the set of previous iterations; determining a first query matrix representative of linearly transformed hidden state of the sink node; determining a first set of self-attention coefficients to give weightage to the plurality of edge-incorporated neural messages sent from plurality of source nodes, the first set of self-attention coefficients determined as a softmax transform product of first query matrix and the first key matrix; calculating a single message vector to be perceived by the sink node based on a matrix multiplication of the first value matrix and the first set of self-attention coefficients, wherein the single message vector determines the hidden state of the sink node in a next iteration occurring subsequent to the current iteration; determining a second key matrix representative of the hidden state of the sink node in the set of previous iterations; determining a second value matrix representative of the hidden state of the sink node in the set of previous iterations; determining a second query matrix as a product of the hidden state of the sink node determined at each of the plurality of previous iterations and a query projection matrix at the current iteration step; determining second set of self-attention coefficients to give weightage to the hidden state of the sink node determined at each of the plurality of previous iterations, the second set of self-attention coefficients determined as a softmax transform product of the second query matrix and the second key matrix; calculating self-attention based transformed hidden state of the sink node based on a product of the second set of self-attention coefficients with the second value matrix; determining the hidden state of the sink node at the current iteration using the single message vector and the self-attention based transformed hidden state of the sink node. Further the method includes transforming the hidden state vector of the sink node to obtain a graph level embedding of the molecular graph; and determining, via the one or more hardware processors, one or more molecular properties using a linear layer from the graph level embedding of the molecular graph.

In another aspect, a system for molecular property prediction using edge conditioned dynamic neighborhood aggregation mechanism is provided. The system includes a memory storing instructions; one or more communication interfaces; and one or more hardware processors coupled to the memory via the one or more communication interfaces, wherein the one or more hardware processors are configured by the instructions to access a database comprising a plurality of molecular graphs associated with a plurality of molecules and a plurality of labels indicative of chemical properties of the plurality of the molecular graphs, wherein each molecular graph of the plurality of molecular graphs comprises a plurality of sink nodes, each sink node of the plurality of sink nodes connected to a plurality of source nodes for passing neural messages through a plurality of edges. Further, the one or more hardware processors are configured by the instructions to update hidden states of the plurality of nodes of each molecular graph from amounts the plurality of molecular graphs by aggregating encoded neural messages from the plurality of sink nodes associated with each of the molecular graphs to transform the hidden representation of each sink node from amongst the plurality of sink nodes in a plurality of iterations, wherein transforming the hidden state of a sink node from amongst the plurality of sink nodes in a current iteration from amongst the plurality of iterations comprises determining a first key matrix representative of a plurality of edge-incorporated neural messages sent by the plurality of source nodes to the sink node in a set of previous iterations occurred prior to the current iteration, determining a first value matrix representative of the plurality of edge-incorporated neural messages sent by the plurality of source nodes to the sink node in the set of previous iterations; determining a first query matrix representative of linearly transformed hidden state of the sink node; determining a first set of self-attention coefficients to give weightage to the plurality of edge-incorporated neural messages sent from plurality of source nodes, the first set of self-attention coefficients determined as a softmax transform product of first query matrix and the first key matrix; calculating a single message vector to be perceived by the sink node based on a matrix multiplication of the first value matrix and the first set of self-attention coefficients, wherein the single message vector determines the hidden state of the sink node in a next iteration occurring subsequent to the current iteration; determining a second key matrix representative of the hidden state of the sink node in the set of previous iterations; determining a second value matrix representative of the hidden state of the sink node in the set of previous iterations; determining a second query matrix as a product of the hidden state of the sink node determined at each of the plurality of previous iterations and a query projection matrix at the current iteration step; determining second set of self-attention coefficients to give weightage to the hidden state of the sink node determined at each of the plurality of previous iterations, the second set of self-attention coefficients determined as a softmax transform product of the second query matrix and the second key matrix; calculating self-attention based transformed hidden state of the sink node based on a product of the second set of self-attention coefficients with the second value matrix; determining the hidden state of the sink node at the current iteration using the single message vector and the self-attention based transformed hidden state of the sink node. Furthermore the one or more hardware processors are configured by the instructions to transform the hidden state vector of the sink node to obtain a graph level embedding of the molecular graph; and determine one or more molecular properties using a linear layer from the graph level embedding of the molecular graph.

In yet another aspect, a non-transitory computer readable medium for executing a method for molecular property prediction using edge conditioned dynamic neighborhood aggregation mechanism is provided. The non-transitory computer readable medium includes a plurality of instructions, which when executed, cause the molecular property prediction via the following method. The method for molecular property prediction using edge conditioned dynamic neighborhood aggregation mechanism is provided. The method includes accessing, via one or more hardware processors, a database comprising a plurality of molecular graphs associated with a plurality of molecules and a plurality of labels indicative of chemical properties of the plurality of the molecular graphs, wherein each molecular graph of the plurality of molecular graphs comprises a plurality of sink nodes, each sink node of the plurality of sink nodes connected to a plurality of source nodes for passing neural messages through a plurality of edges. Further, the method includes updating, via the one or more hardware processors, hidden states of the plurality of nodes of each molecular graph from amounts the plurality of molecular graphs by aggregating encoded neural messages from the plurality of sink nodes associated with each of the molecular graphs to transform the hidden representation of each sink node from amongst the plurality of sink nodes in a plurality of iterations, wherein transforming the hidden state of a sink node from amongst the plurality of sink nodes in a current iteration from amongst the plurality of iterations comprises determining a first key matrix representative of a plurality of edge-incorporated neural messages sent by the plurality of source nodes to the sink node in a set of previous iterations occurred prior to the current iteration, determining a first value matrix representative of the plurality of edge-incorporated neural messages sent by the plurality of source nodes to the sink node in the set of previous iterations; determining a first query matrix representative of linearly transformed hidden state of the sink node; determining a first set of self-attention coefficients to give weightage to the plurality of edge-incorporated neural messages sent from plurality of source nodes, the first set of self-attention coefficients determined as a softmax transform product of first query matrix and the first key matrix; calculating a single message vector to be perceived by the sink node based on a matrix multiplication of the first value matrix and the first set of self-attention coefficients, wherein the single message vector determines the hidden state of the sink node in a next iteration occurring subsequent to the current iteration; determining a second key matrix representative of the hidden state of the sink node in the set of previous iterations; determining a second value matrix representative of the hidden state of the sink node in the set of previous iterations; determining a second query matrix as a product of the hidden state of the sink node determined at each of the plurality of previous iterations and a query projection matrix at the current iteration step; determining second set of self-attention coefficients to give weightage to the hidden state of the sink node determined at each of the plurality of previous iterations, the second set of self-attention coefficients determined as a softmax transform product of the second query matrix and the second key matrix; calculating self-attention based transformed hidden state of the sink node based on a product of the second set of self-attention coefficients with the second value matrix; determining the hidden state of the sink node at the current iteration using the single message vector and the self-attention based transformed hidden state of the sink node. Further the method includes transforming the hidden state vector of the sink node to obtain a graph level embedding of the molecular graph; and determining, via the one or more hardware processors, one or more molecular properties using a linear layer from the graph level embedding of the molecular graph.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 3A and 3B is a flow diagram illustrating a method for molecular property prediction using edge conditioned dynamic neighborhood aggregation mechanism in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Convolution Neural Networks (CNNs) have contributed to a broad range of scientific breakthroughs, in the fields as deep residual learning for visual recognition, self-driving cars, optical character recognition engine, acoustic modeling in speech recognition, neural machine translation, etc. In view of the inherent methodology, CNN and its variant structured neural network architectures obtain dimensionality reduction and extract dominant features by performing spatial convolutions on Euclidean domains. The ConvNets input is obliged to, therefore, have a regular and grid-like structure. This restriction hampers the utilization of CNN's to numerous scientific disciplines, where irregular graph structure or manifold data are commonly accessible.

Figure 1A:
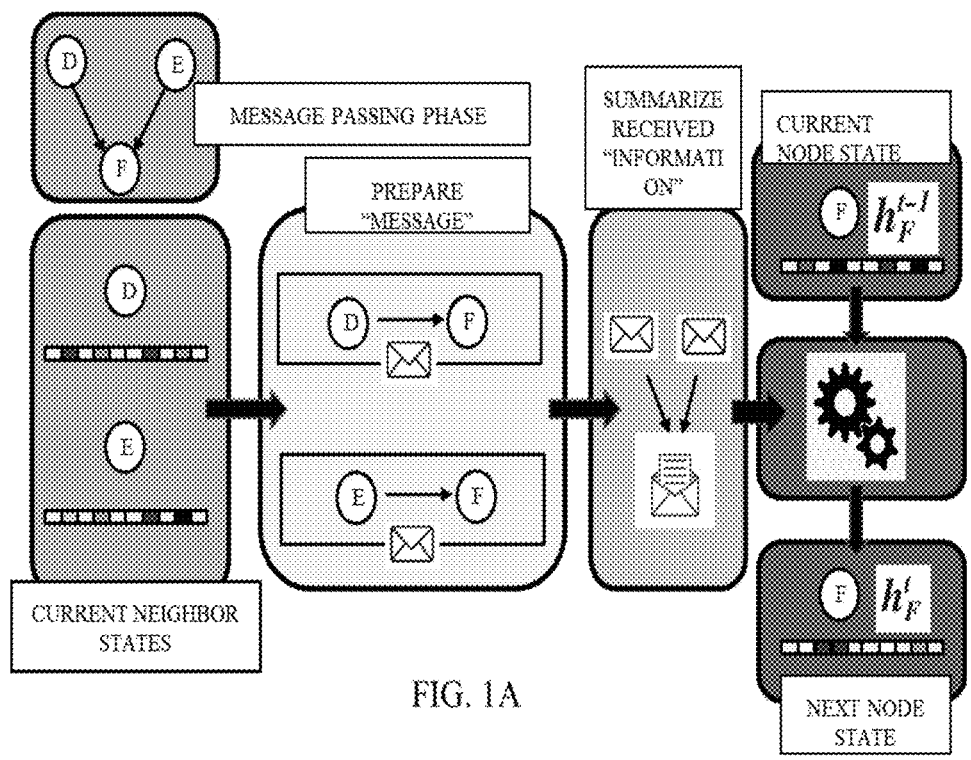
FIG. 1A illustrates a representation of message passing phase of a conventional message passing neural network (MPNN).

Chemical graph theory treats drug-like organic molecules as non-linear static graphs. Message Passing Neural Networks (MPNN) framework merges several distinct and unique contemporary models that exist in the literature. The MPNNs are an abstraction of a non-spectral approach based Graph Convolution Networks. The MPNNs operate on undirected chemical/molecular graphs, $\mathcal{G}^{\mathcal{M}} = (\mathcal{V}^{\mathcal{M}}, \mathcal{E}^{\mathcal{M}})$ for target property prediction, as illustrated in FIG. 1A.

Let $N^{\mathcal{M}}(|\mathcal{V}^{\mathcal{M}}|)$ denote the number of nodes and $E^{\mathcal{M}}(|\mathcal{E}^{\mathcal{M}}|)$ represents the number of edges for a homogenous chemical graph, $\mathcal{G}^{\mathcal{M}}$. $\mathcal{G}^{\mathcal{M}}$ is described by a set of node features, $N^{\mathcal{M}} \in \mathbb{R}^{|\mathcal{V}^{\mathcal{M}}| \times c}$, $N_i^{\mathcal{M}} \in R^{1 \times c}$ $\forall i \in \mathcal{V}^{\mathcal{M}}$ and edge features $e_{ij}^{\mathcal{M}} \in R^{|\mathbb{E}^{\mathcal{M}}| \times z}$, $\forall (i,j) \in \mathcal{E}^{\mathcal{M}}$. Here, i & j$\in \mathcal{V}^{\mathcal{M}}$ refer to the neighboring nodes of the chemical graph and are connected by an arbitrary edge, $(i,j) \in \mathcal{E}^{\mathcal{M}} \leftrightarrow (j,i) \in \mathcal{E}^{\mathcal{M}}, \forall j \in \mathcal{N}(i)$. The chemical graph connectivity $\mathcal{G}^{\mathcal{M}} = (\mathcal{V}^{\mathcal{M}}, \mathcal{E}^{\mathcal{M}})$ is given by the adjacency matrix, $\mathcal{G}_A^{\mathcal{M}}$.

Molecules are represented as annotated undirected chemical graphs. The atoms are considered to be the nodes of the chemical graphs. The bonds connecting adjacent atoms in the chemical graphs correspond to edges. The MPNN framework is leveraged in this particular scientific discipline for mathematical modeling of the drug-like organic molecules. It helps to gain insight and assists in the description of the chemical graph's topology into a characteristic representation of the entire chemical graphs to later aid in the molecular property prediction task. Based on the graph's connectivity, an incident edge in between two neighboring atoms in the chemical compound (or nodes in a chemical/molecular graph) acts as both arriving and departing edge tagged by the same label (bond type).

Figure 1B:
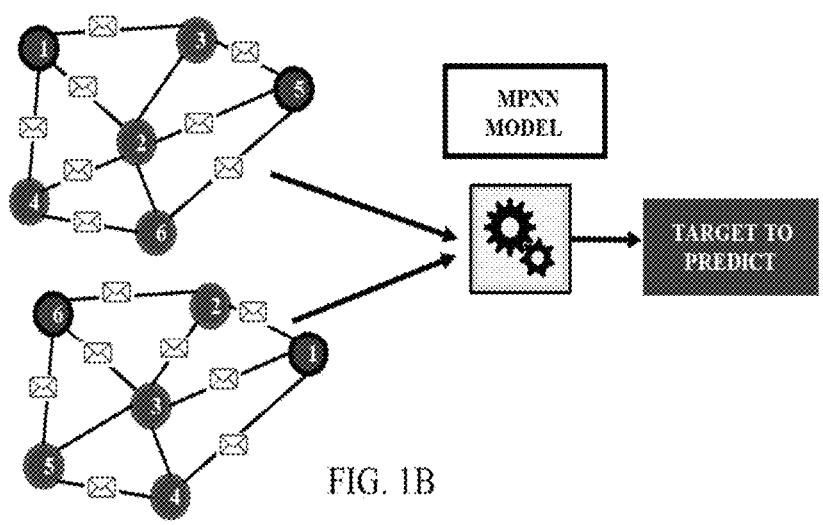
FIG. 1B illustrates a representation of readout phase of a conventional message passing neural network (MPNN).
Figure 1C:
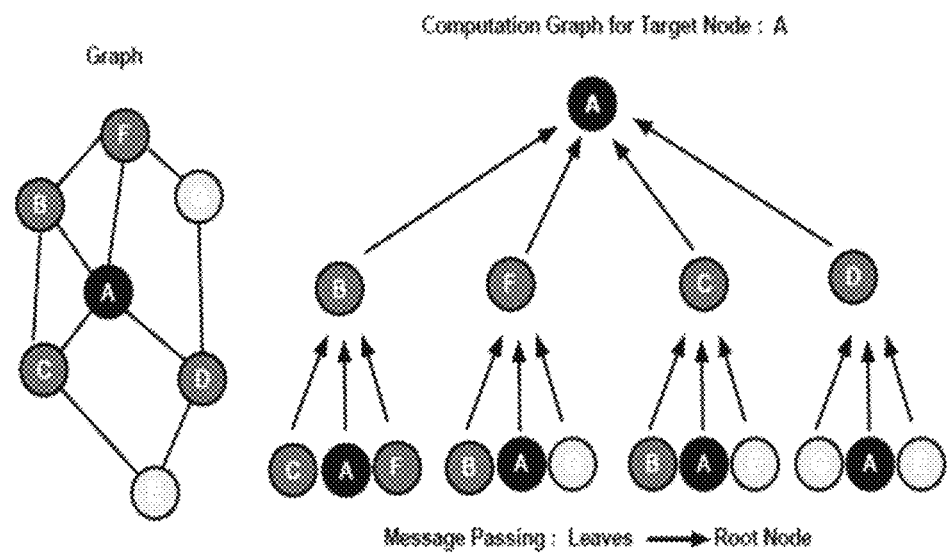
FIG. 1C illustrates a representation of message passing phase of a conventional message passing neural network (MPNN).
Figure 1D:
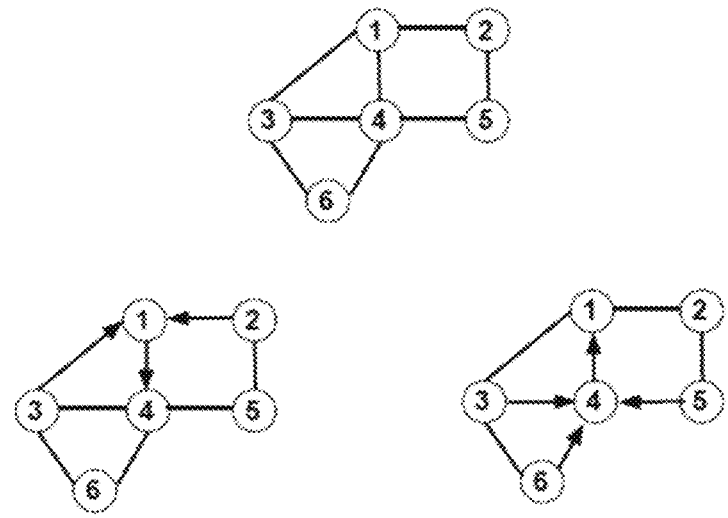
FIG. 1D illustrates a representation of readout phase of a conventional message passing neural network (MPNN).

As illustrated in FIGS. 1B, 1C, and 1D, the MPNNs forward pass consists of two phases—a message passing phase (illustrated in FIG. 1C) and a readout phase (illustrated in FIG. 1D). The message passing phase generates neural messages and update node representations by aggregating encoded information of node's embeddings from confined graph neighborhood. A permutation invariant readout phase is leveraged to perform graph pooling. Readout phase function takes an adjacency matrix $\mathcal{G}_A^{\mathcal{M}}$ as input and satisfies the following property, $\mathcal{F}(P\mathcal{G}_A^{\mathcal{M}} P^T) = \mathcal{F}(\mathcal{G}_A^{\mathcal{M}})$. Here, P is a permutation matrix. The message propagation utilizes the distinct message generating functions acting on the undirected chemical graph topology $M_{in}^f$ and $M_{out}^f$ represents the universal function approximator for the generation of neural messages received through a particular edge type and propagated from the same edge-type between the nodes of the chemical graphs, respectively. Based on the direction of the edge under consideration, that particular transformation function is put into operation on the edge, $e_{ji}^{\mathcal{M}}$. The MPNNs forward pass communicates messages as described by a computational graph for every target node from the bottom (leaf) node to the top (root) node by iterating for T computational time steps. These outgoing messages are evaluated for every edge by transforming the source node's hidden state according to the edge feature vector.

Identical edge-type incident on different node neighbors, which is characterized by distinct edge feature vectors share with the same instance of the message generating neural-network function. Each node in the molecular graph aggregates neural messages (message-pooling operation) from its local T-hop neighbors, as determined from $\mathcal{G}_A^{\mathcal{M}}$ and the received messages are perceived by the target node by performing mathematical computations to update its hidden representation. This message-passing scheme assists in learning effective discriminative hidden representations of the nodes in the chemical graphs, by adopting a Back-propagation through time (BPTT) learning algorithm for training the MPNNs framework when solved for graph-based inductive learning tasks. The MPNNs are synchronous message-passing systems. They update all messages in parallel. In the end, each edge between the vertices in the chemical graph have messages evaluated in both directions from the source to sink and contrariwise. The message passing phase is described by utilizing a message generating function, $M^f$, and node-embedding update neural network function, $V^f$. $M^f$ and $V^f$ might take possession of diverse in specific to be at variance with function settings. During the span of the message passing phase, the node-level embedding $h_i^t$ of every unique vertex in the molecular graph as given by its computational graph are overhauled and assembled on structural and feature information embedded messages $m_i^{t+1}$, received from its one-hop neighbors as depicted by, $$m_i^{t+1} = \Sigma_{j \in N(i)} M^f(h_j^t, e_{ji}^{\mathcal{M}}) \quad (1)$$

$$h_i^{t+1} = V^f(h_i^t, m_i^{t+1}) \quad (2)$$

Here, $\Sigma_{j\in N(i)}$ depicts the aggregation of neural-information embedded messages over the local one-hop neighborhood of the node, $i \in \mathcal{V}^M$ in the chemical graph, $\mathcal{G}^M$. Here, $h_i$ is learned with the MPNN model parameters through a representative function of the entire input graph when solved for addressing supervised graph regression tasks such as molecular graph property prediction. The readout phase of the MPNN framework performs graph-pooling through set-pooling approach by determining a discriminative graph embedding for the entire input molecular graph by utilizing a differentiable node-reordering invariant neural network function, $R^f$ according to, $\hat{y}=R^f(\{h_i^T|i\in\mathcal{V}^M(\mathcal{G}^M)\})$. $M^f$, $V^f$, and $R^f$ are differentiable neural network functions and have learnable parameters. Mini-Batching with an MPNN with batch size as a hyper-parameter results in the faster training and augments performance of the graph-based deep learning algorithm. It is viable here in this context as it initiates and propagates neural messages across several molecular graphs with varying numbers of vertices $|\mathcal{V}^M|$ and $|\mathcal{E}^M|$. The feature representation of the vertices in the molecular graph, $\mathcal{G}^M$ is denoted by, data.x. data.edgeindex describes the edge indices of source and sink vertices of the edge under consideration and vice-versa. data.edgeattr represents the static edge attributes. data.y is the pre-determined DFT-evaluated properties (ground-truth) for the chemical graphs. The discrepancy between the MPNN model output (estimated) and the true values are measured by the mean-squared error loss function for this graph-based supervised regression task. The Edge-Conditioned Convolution Networks (ECCN) is described by, $h_i^{t+1}=\Lambda h_i^t + \Sigma_{j\in N(i)} h_j^t \cdot \Omega_\Lambda(e_{ij}^M)$ Here, $\Omega_\Lambda$ denotes a multilayer perceptron, parameterized by $\Lambda$. The aggregated vector message perceived by the sink node, i is described by $m_i^{t+1}=\Sigma_{j\in N(i)} h_j^t \cdot \Omega_\Lambda(e_{ij}^M)$. The MPNN framework message-generating neural-network function is described by, $M^f(h_i^t, e_{ij}^M)=h_j^t \cdot \Omega_\Lambda(e_{ij}^M)$. The vertex update function is described by, $V^f(h_i^t, m_i^{t+1}):GRU(h_i^t, m_i^{t+1})$. Here, GRU is a known Gated Recurrent Unit. The hidden state of the previous state is given by, $V^f(h_i^t, m_i^{t+1}):GRU(h_i^t, m_i^{t+1})$.

Here, n denotes the total number of nodes in the chemical graphs in a given batch size. $d_m$ & $d_h$ are the characteristic dimension of neural messages and node attributes respectively. Here, the reset gate, $R_t$, $Z_t$, $h_i^t$, $\tilde{h}_i^t$ are evaluated as, $$R_t = \sigma(m_i^{t+1}W_r + h_i^t W_{rh} + b_r), \quad (3)$$

$$Z_t = \sigma(m_i^{t+1}W_z + h_i^t W_{zh} + b_z) \quad (4)$$

$$\tilde{h}_i^t = \tanh(m_i^{t+1}W_{\tilde{h}} + (R_t \odot h_i^t)W_{hh} + b_h) \quad (5)$$

$$h_i^{t+} = Z_t \odot h_i^t + (1-Z_t) \odot \tilde{h}_i^t \quad (6)$$

Here, $W_r$, $W_z$, $W_{\tilde{h}} \in \mathbb{R}^{d_m \times d_h}$, $W_{rh}$, $W_{zh}$, $W_{hh} \in \mathbb{R}^{d_h \times d_h}$ are the weight parameters, $b_r$, $b_z$, $b_h \in \mathbb{R}^{1 \times d_h}$ are the bias.

The graph-level global pooling neural network is evaluated as $$\hat{y}=R^f(\{h_i^T|i\in\mathcal{V}^M(\mathcal{G}^M)\}):Set2Set(\{h_i^T|i\in\mathcal{V}^M(\mathcal{G}^M)\}) \quad (7)$$

The MPNN however leads to over-smoothing of learnable embeddings for vertices with higher valency. In addition, the MPNN's suffer from inherent limitation to effectively encapsulate the characteristics of the molecular graph. Moreover, due to its high computational complexity, MPNNs are not viable for real-time molecular property prediction. Various embodiments described herein provides a method and system for molecular property prediction using an edge-conditioned graph attention neural networks. The disclosed system is resilient to noise by learning to adapt to kingpin on the task-relevant fragment of the molecular graphs at varying receptive fields, locality, and depth to augment the discriminative power of node and graph-level embeddings. The disclosed method learns the expressive/discriminative node and graph level embeddings to aid in molecular property prediction with a reduced computational complexity.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 2:
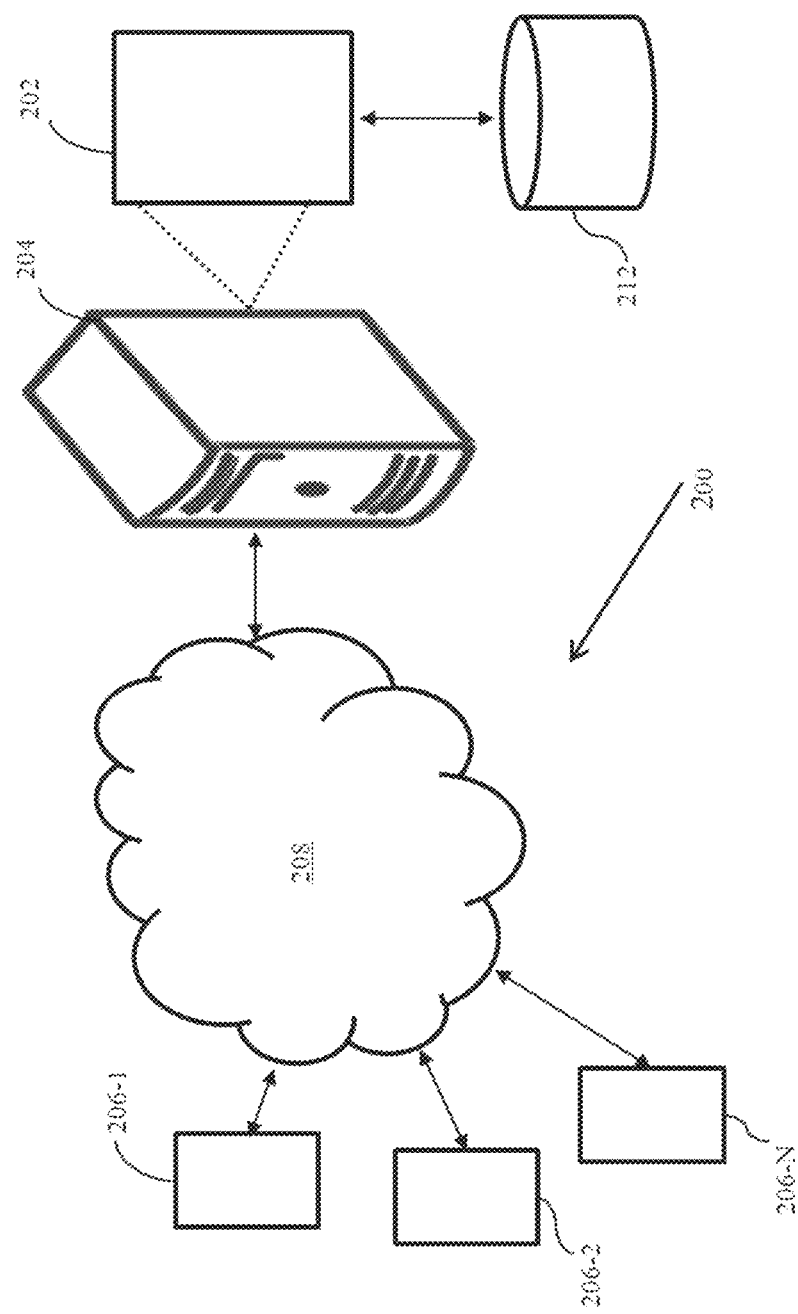
FIG. 2 illustrates a network implementation of a system for molecular property prediction using edge conditioned dynamic neighborhood aggregation mechanism according to some embodiments of the present disclosure.
Figure 3B:
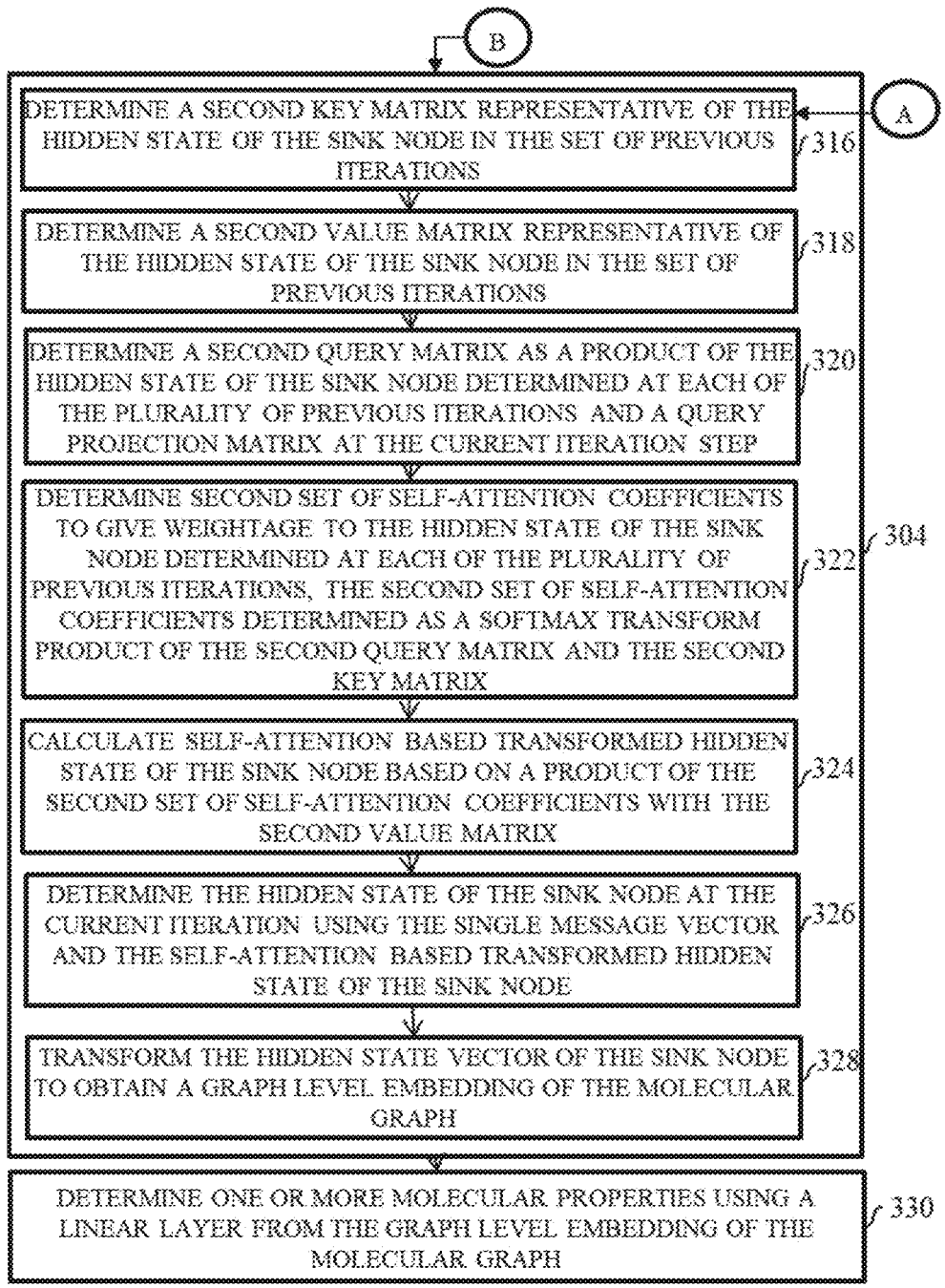
Figure 4:
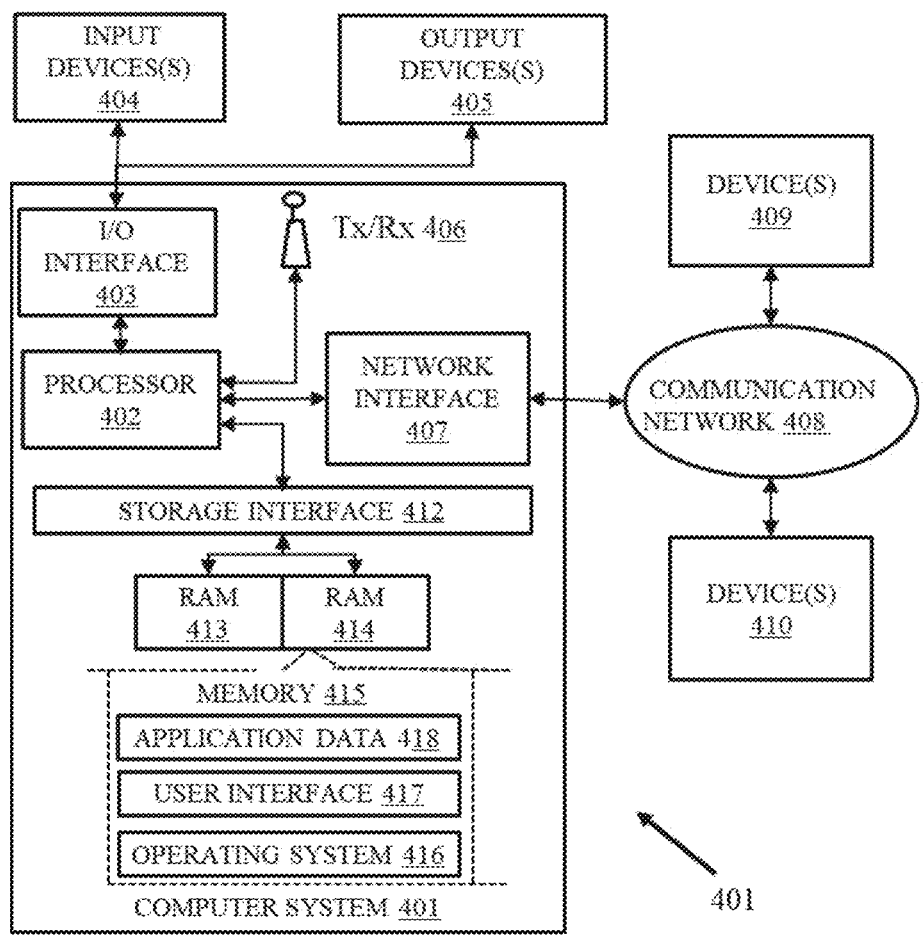
FIG. 4 is a block diagram of an exemplary computer system for implementing embodiments consistent with the present disclosure.

Referring now to the drawings, and more particularly to FIG. 2 through 4, where similar reference characters denote corresponding features consistently throughout the figures, there are shown preferred embodiments and these embodiments are described in the context of the following exemplary system and/or method.

FIG. 2 illustrates a network implementation 200 of a system for molecular property prediction using edge conditioned dynamic neighborhood aggregation mechanism according to some embodiments of the present disclosure. The disclosed system provides a supervised learning on drug-like potential molecules for use in effective drug discovery. It provides substantial prospects in diminishing the computational complexity which is a key desideratum for prognostication of molecular properties and aid in billion price tag cost reduction of developing a potential drug for treatment.

The proposed system comprises of message-passing, vertex update and graph-pooling modules which augment the graph-level prediction tasks accuracy by taking into account the structure of the graph. The proposed design of message-passing pipeline augments the graph-level prediction tasks accuracy by taking into account the structure of the molecular graph.

Although the present disclosure is explained considering that the system 202 is implemented on a server, it may be understood that the system 202 may also be implemented in a variety of computing systems 204, such as a laptop computer, a desktop computer, a notebook, a workstation, a cloud-based computing environment and the like. It will be understood that the system 202 may be accessed through one or more devices 206-1, 206-2 . . . 206-N, collectively referred to as devices 206 hereinafter, or applications residing on the devices 206. Examples of the devices 206 may include, but are not limited to, a portable computer, a personal digital assistant, a handheld device, a smartphone, a tablet computer, a workstation and the like. The devices 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 202 through communication links.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a database, for example, a database 212. The database 212 may store data processed, received, and generated by the system 202. Additionally, the database 212 includes a plurality of molecular graphs associated with a plurality of molecules and a plurality of labels indicative of chemical properties of the plurality of the molecular graphs. In an alternate embodiment, the system 202 may include the database 212.

The network implementation 200 supports various connectivity options such as BLUETOOTH®, USB, ZigBee and other cellular services. The network environment enables connection of devices 206 such as Smartphone with the server 204, and accordingly with the database 212 using any communication link including Internet, WAN, MAN, and so on. In an exemplary embodiment, the system 202 is implemented to operate as a stand-alone device. In another embodiment, the system 202 may be implemented to work as a loosely coupled device to a smart computing environment.

FIGS. 3A and 3B illustrate a flow chart of a method 300 for method for molecular property prediction using edge conditioned dynamic neighborhood aggregation mechanism, in accordance with an example embodiment of present disclosure. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 202. However, the operations of the method 300 can be described and/or practiced by using any other system.

The dynamic neighborhood aggregation mechanism updates the hidden states of the nodes of the graph by attending to all previous layers' embeddings of local graph neighbors (also referred to as source node hereinafter) of differing locality. The method includes aggregating encoded neural messages from local-graph neighbors (or source nodes) to transform the hidden representation of each sink node. The DNA formulation leverages the multi-head self-attention mechanism. It is permutation-invariant. The attention module computes the scaled dot-product between key-query pairs, and then later the weighted softmax-normalized output by the value vectors is utilized as the attention coefficients. The DNA scheme permits each pair of a node-local graph neighbors, given by molecular graph's connectivity to attend to all its previous depictions of hidden states, thereby, utilizing the multi-head attention aggregated outputs for updating the node embeddings of the molecular graph. The disclosed method includes an Edge-Conditioned Dynamic Neighborhood aggregation operator, which overcomes the limitations of DNA scheme by fusing the static edge attributes in determining the self-attention coefficients, which is described in the description of the method 300 below.

At step 302 of method 300, a database (for example, the database 212) comprising a plurality of molecular graphs associated with a plurality of molecules is accessed, via one or more hardware processors. The database further includes a plurality of labels indicative of chemical properties of the plurality of the molecular graphs. Each molecular graph of the plurality of molecular graphs comprises a plurality of sink nodes such that each sink node of the plurality of sink nodes connected to a plurality of source nodes for passing neural messages through a plurality of connecting edges. For example, the database may include annotated independent and identically distributed molecular graphs, $D^M = (G_1^M, y_1^M)$, $(G_2^M, y_2^M) \ldots (G_{|D^M|}^M, y_{|D^M|}^M)$ Here, $y_i^M$ are the associated chemical properties corresponding to the molecular graph, $G_i^M$. The objective of the graph-based molecular property prediction framework is by operating on the topology of the molecular graphs described by a set of node features, $N^M \in \mathbb{R}^{|V^M| \times c}$ and static edge features, $e_{ij}^M \in \mathbb{R}^{|\varepsilon^M| \times z}$, $\forall (i,j) \in \varepsilon^M$ is to learn a novel mapping $f: G^M \to h_k^M$, $\forall k \in V^M \to h_k^M \to y_i^M$ that maps molecular graphs structure to the set of labels. $h_k^M$ is the learned hidden representation vector of node k. Here, $y_i^M$ denotes the target molecular properties.

At 304, the method 300 includes updating hidden states of the plurality of nodes of each of the molecular graphs by aggregating encoded neural messages from the plurality of sink nodes associated with each molecular graph to transform the hidden representation of each sink node from amongst the plurality of sink nodes in a predetermined plurality of iterations. The hidden state of a sink node i is transformed by utilizing a neural-net function, $\Gamma_\Theta$ which takes as input (1) an aggregated single-message vector $(h_{i \leftarrow j}^{(t)})$ obtained by the self-attention mechanism, and (2) a self-attention based transformed hidden state $(h_{i \leftarrow i}^{(t)})$ of the sink node. The hidden state of a sink node i is given by:

$$h_i^{(t)} = \Gamma_\Theta(h_{i \leftarrow i}^{(t)}, \{h_{i \leftarrow j}^{(t)} : j \in \mathcal{N}(i)\})$$

Here, $\Theta$ represents the trainable parameters of the neural-net.

The method for transforming the hidden state of a sink node from amongst the plurality of sink nodes in a current iteration from amongst the plurality of iterations is described further with reference to steps 306-322. The method for computing aggregated single-message vector $(h_{i \leftarrow j}^{(t)})$ obtained by the self-attention mechanism is described further with reference to steps 306-314. The method for computing the self-attention based transformed hidden state $(h_{i \leftarrow i}^{(t)})$ of the sink node is described further with reference to steps 316-322.

At step 306, the method 300 includes determining a first key matrix representative of a plurality of edge-incorporated neural messages sent by the plurality of source nodes to the sink node in a set of previous iterations occurred prior to the current iteration. The first key matrix is determined by the transpose of the product of key projection matrix $\Theta_K^{(t)}$ at iteration step, t and sum of the concatenated matrix $[h_j^{(1)}, \ldots, h_j^{(t-1)}]$ of the source node, j hidden states from the previous iteration steps, and a linearly transformed edge-information, $w_i e_{ji}^M$. Herein, $W_1$ is the trainable weight matrix. The learnable weight matrices are shared across the nodes of the molecular graph.

At step 308, the method 300 includes determining a first value matrix representative of a plurality of edge-incorporated neural messages sent by the plurality of source nodes to the sink node in the set of previous iterations. The first value matrix is determined by the product of (1) the value projection matrix $\Theta_V^{(t)}$ at iteration step, t, and (2) the sum of the concatenated matrix $[h_j^{(1)}, \ldots, h_j^{(t-1)}]$ of the source node, j hidden states from the previous iteration steps, and the linearly transformed edge-information ($w_i e_{ji}^M$). Herein, $W_2$ is the trainable weight matrix. The learnable weight matrices are shared across the nodes of the molecular graph.

At step 310, the method 300 includes determining a first query matrix representative of linearly transformed hidden state of the sink node. The first query matrix is determined as a product of a query projection matrix ($\Theta_Q^{(t)}$) at iteration step t and the hidden state ($h_i^{(t-1)}$) of the sink node, i at previous iteration step, t–1.

At step 312, the method 300 includes determining a first set of self-attention coefficients to give weightage to the plurality of edge-incorporated neural messages sent from the plurality of source nodes. The first set of self-attention coefficients are determined as a softmax transform product of first query matrix and the first key matrix, as shown below:

$$softmax\left(\frac{(h_i^{(t-1)}\Theta_Q^{(t)})(([h_j^{(1)}, \ldots, h_j^{(t-1)}] + W_1 e_{ji}^M)\Theta_K^{(t)})^\top}{\sqrt{d}}\right)$$

At step 314, the method 300 includes calculating a single message vector ($h_{i \leftarrow j}^{(t)}$) to be perceived by the sink node (i) based on a matrix multiplication of the first value matrix and the first set of self-attention coefficients.

$$h_{i \leftarrow j}^{(t)} = softmax\left(\frac{(h_i^{(t-1)}\Theta_Q^{(t)})(([h_j^{(1)}, \ldots, h_j^{(t-1)}] + W_1 e_{ji}^M)\Theta_K^{(t)})^\top}{\sqrt{d}}\right)$$
$$(([h_j^{(1)}, \ldots, h_j^{(t-1)}] + W_2 e_{ji}^M)\Theta_V^{(t)})$$

The single message vector determines the hidden state of the sink node in a next iteration occurring subsequent to the current iteration.

At step 316, the method 300 includes determining a second key matrix representative of the hidden state of the sink node in the set of previous iterations. The second key matrix is determined by the transpose of the product of key projection matrix $\Theta_K^{(t)}$ at iteration step, t and the concatenated matrix $[h_i^{(1)}, \ldots, h_i^{(t-1)}]$ of the sink node, i hidden states from the previous iteration steps.

At step 318, the method 300 includes determining a second value matrix representative of the hidden state of the sink node in the set of previous iterations. The second value matrix is determined by the product of (1) the value projection matrix $\Theta_V^{(t)}$ at iteration step, t, and (2) the sum of the concatenated matrix $[h_j^{(1)}, \ldots, h_j^{(t-1)}]$ of the sink node, i hidden states from the previous iteration steps.

At step 320, the method 300 includes determining a second query matrix as a product of the hidden state of the sink node determined at each of the plurality of previous iterations $h_i^{(t-1)}$ and a query projection matrix $\Theta_V^{(t)}$ at the current iteration step. At step 322, the method 300 includes determining a second set of self-attention coefficients to give weightage to the hidden state of the sink node determined at each of the plurality of previous iterations. The second set of self-attention coefficients are determined as a softmax transform product of the second query matrix and the second key matrix, as shown below:

$$softmax\left(\frac{(h_i^{(t-1)}\Theta_Q^{(t)})([h_i^{(1)}, \ldots, h_i^{(t-1)}]\Theta_K^{(t)})}{\sqrt{d}}\right)$$

where, d is the characteristic dimension of the node embedding

At step 324, the method 300 includes calculating self-attention based transformed hidden state of the sink node based on a product of the second set of self-attention coefficients with the second value matrix.

$$h_{i \leftarrow i}^{(t)} = softmax\left(\frac{(h_i^{(t-1)}\Theta_Q^{(t)})([h_i^{(1)}, \ldots, h_i^{(t-1)}]\Theta_K^{(t)})^\top}{\sqrt{d}}\right)([h_i^{(1)}, \ldots, h_i^{(t-1)}]\Theta_V^{(t)})$$

At step 326, the method 300 includes determining the hidden state of the sink node at the current iteration using the single message vector and the self-attention based transformed hidden state of the sink node.

In an embodiment, the system transforms the hidden state of the sink node i by utilizing a neural network function $\Gamma_\Theta$ which takes as input (1) an aggregated single-message vector ($h_{i \leftarrow j}^{(t)}$) obtained by the self-attention mechanism, and (2) a self-attention based transformed hidden state ($h_{i \leftarrow i}^{(t)}$) of the sink node. The hidden state of a sink node i is given by:

$$h_i^{(t)} = \Gamma_\Theta(h_{i \leftarrow i}^{(t)}, \{h_{i \leftarrow j}^{(t)} : j \in \mathcal{N}(i)\})$$

where $\Theta$ represents the trainable parameters of the neural-net.

At step 328, the method 300 includes transforming, via the one or more hardware processors, the hidden state vector of the sink node to obtain a graph level embedding ($h_i^{(t)}$) of the molecular graph. At 330, the method 300 includes determining, via the one or more hardware processors, one or more molecular properties using a linear layer from the graph level embedding of the molecular graph. In an embodiment, the set2set algorithm may be utilized for determining the molecular properties using the linear layer from the graph level embedding of the molecular graph.

FIG. 4 is a block diagram of an exemplary computer system 401 for implementing embodiments consistent with the present disclosure. The computer system 401 may be implemented in alone or in combination of components of the system 202 (FIG. 2). Variations of computer system 401 may be used for implementing the devices included in this disclosure. Computer system 401 may comprise a central processing unit ("CPU" or "hardware processor") 402. The hardware processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 402 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 402 may be a multi-core multi-threaded processor.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 507. The network interface 407 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409 and 410. These devices may include, without limitation, personal computer(s), server(s), fax machines, printers, scanners, various mobile devices such as cellular telephones, smartphones (e.g., Apple iPhone, Blackberry, Android-based phones, etc., tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 416, user interface application 417, user/application data 418 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 401 may store user/application data 418, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example

For the purpose of validation, experiments were conducted using QM-9 data set.

The model (as implemented by the disclose system) was trained for graph-level-based regression tasks for the Quantum Chemistry property prediction task. Message passing computational steps, T was constrained to be at 3. The set2set mathematical iterations, M was on par with T. Here, the model trained by leveraging a random selection of datasets for stochastic gradient descent optimization with the Adaptive Moment Estimation optimizer algorithm, with batch size 10. The number of iterations(epochs) is 100 cycles through the full training dataset. The beginning learning rate was chosen as $1e^{-3}$. The learning rate was decayed at 51st epoch by half and maintained it constant in the span of [51; 75] epochs throughout the training and the beginning step size learning rate I decayed to a terminating learning rate $2.5e^{-4}$, using a decay factor by 4 in the range [76; 100] epochs. The QM-9 dataset consists of approximately 134K molecules. The validation set comprises 10000 samples. The test set is composed of 10000 samples and the remaining are for the training set. Here, early stopping is implemented on the validation dataset to prevent the model from over-fitting and for model selection. Finally, the performance of the model was evaluated and the evaluation metric based totally on the test set was published. Feature scaling was performed on the target properties to be predicted. Z-score normalization is leveraged to have distribution mean zero and the expectation of the squared deviation to one for each target property. The gradient descent (aka back-propagation) algorithm was run in weight space by updating the parameters according to the gradients of the loss function, the mean squared error between the predicted model outputs and the predetermined DFT properties. The results are reported in MAE metric in the table below.

Various embodiments described herein method and system for molecular property predictions. The disclosed method includes transforming the hidden state of a sink node by utilizing a neural-net function, which takes as input an aggregated single-message vector obtained by the self-attention mechanism and the self-attention mechanism transformed hidden state of the node. The disclosed method overcomes the limitations of typical dynamic neighborhood aggregation (DNA) method by fusing the static edge attributes in determining the self-attention coefficients.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongo-

TABLE 1

Performance comparison of the disclosed method with the baseline algorithms on test dataset

| Target | Unit | PPGN | SchNet | PhysNet | MEGNet-s | Comorant | DimeNet | EC-DNA |
|---|---|---|---|---|---|---|---|---|
| Cv | cal = (mol K) | 0.055 | 0.033 | 0.0529 | 0.05 | | 0.13 | 0.0286 |
| G | meV | 36.4 | 14 | 9.4 | 12 | — | 8.98 | 0.0156 |
| H | meV | 36.3 | 14 | 8.42 | 12 | — | 8.11 | 0.0099 |
| HOMO | meV | 40.3 | 41 | 32.9 | 43 | 36 | 27.8 | 0.0036 |
| LUMO | meV | 32.7 | 34 | 24.7 | 44 | 36 | 19.7 | 0.0045 |
| R2 | Bohr2 | 0.592 | 0.073 | 0.765 | 0.302 | 0.673 | 0.331 | 0.0821 |
| U | meV | 36.8 | 14 | 8.15 | 12 | — | 7.89 | 0.0035 |
| U0 | meV | 36.8 | 14 | 8.15 | 12 | — | 8.02 | 0.0011 |
| ZPVE | meV | 3.12 | 1.7 | 1.39 | 1.43 | 1.98 | 1.29 | 0.0006187 |
| alpha | Bohr3 | 0.131 | 0.235 | 0.0615 | 0.081 | 0.092 | 0.0469 | 0.0453 |
| gap | meV | 60 | 63 | 42.5 | 66 | 60 | 34.8 | 0.0401 |
| mu | D | 0.047 | 0.033 | 0.0529 | 0.05 | 0.13 | 0.0286 | 0.0789 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from ing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
accessing, via one or more hardware processors, a database comprising a plurality of molecular graphs associated with a plurality of molecules and a plurality of labels indicative of chemical properties of the plurality of the molecular graphs, wherein each molecular graph of the plurality of molecular graphs comprises a plurality of sink nodes, each sink node of the plurality of sink nodes connected to a plurality of source nodes for passing neural messages through a plurality of connecting edges;
updating, via the one or more hardware processors, hidden states of the plurality of nodes of each molecular graph from amounts of the plurality of molecular graphs by aggregating encoded neural messages from the plurality of sink nodes associated with each of the molecular graphs to transform a hidden representation of each sink node from amongst the plurality of sink nodes in a plurality of iterations, wherein transforming the hidden state of a sink node from amongst the plurality of sink nodes in a current iteration from amongst the plurality of iterations comprises:
determining a first key matrix representative of a plurality of edge-incorporated neural messages sent by the plurality of source nodes to the sink node in a set of previous iterations that occurred prior to the current iteration;
determining a first value matrix representative of the plurality of edge-incorporated neural messages sent by the plurality of source nodes to the sink node in the set of previous iterations;
determining a first query matrix representative of a linearly transformed hidden state of the sink node;
determining a first set of self-attention coefficients to give weightage to the plurality of edge-incorporated neural messages sent from the plurality of source nodes, the first set of self-attention coefficients determined as a softmax transform product of the first query matrix and the first key matrix;
calculating a single message vector to be perceived by the sink node based on a matrix multiplication of the first value matrix and the first set of self-attention coefficients, wherein the single message vector determines the hidden state of the sink node in a next iteration occurring subsequent to the current iteration;
determining a second key matrix representative of the hidden state of the sink node in the set of previous iterations;
determining a second value matrix representative of the hidden state of the sink node in the set of previous iterations;
determining a second query matrix as a product of the hidden state of the sink node determined at each of the plurality of previous iterations and a query projection matrix at the current iteration step;
determining a second set of self-attention coefficients to give weightage to the hidden stage of the sink node determined at each of the plurality of previous iterations, the second set of self-attention coefficients determined as a softmax transform product of the second query matrix and the second key matrix;
calculating a self-attention based transformed hidden state of the sink node based on a product of the second set of self-attention coefficients with the second value matrix;
determining the hidden state of the sink node at the current iteration using the single message vector and the self-attention based transformed hidden state of the sink node; and
transforming the hidden state vector of the sink node to obtain a graph level embedding of the molecular graph; and
determining, via the one or more hardware processors, one or more molecular properties using a linear layer from the graph level embedding of the molecular graph.

2. The method of claim 1, wherein the first key matrix is determined by computing a transpose of a product of a key projection matrix and a sum of a concatenated matrix of the source node hidden states from the set of previous iterations and the linearly transformed edge-information, wherein the linearly transformed edge-information is obtained by parameterizing edge-information with a first trainable weight matrix.

3. The method of claim 2, wherein the second key matrix is determined by a transpose of a product of the key projection matrix at the current iteration and a concatenated matrix of the sink node hidden states from the set of previous iterations.

4. The method of claim 1, wherein the first value matrix is determined by computing a transpose of a product of a value projection matrix and a sum of a concatenated matrix of the source node hidden states from the set of previous iterations and the linearly transformed edge-information, wherein the linearly transformed edge-information is obtained by parameterizing edge-information with a second trainable weight matrix.

5. The method of claim 4, wherein the second value matrix is determined by the product of (1) the value projection matrix at the current iteration, and (2) a sum of a concatenated matrix of the sink node hidden states from the set of previous iterations.

6. The method of claim 1, wherein the first query matrix is determined as a product of a query projection matrix at the current iteration and the hidden state of the sink node at a previous iteration from amongst the set of previous iterations.

7. A system, comprising:
a memory storing instructions;
one or more communication interfaces; and
one or more hardware processors coupled to the memory via the one or more communication interfaces, wherein the one or more hardware processors are configured by the instructions to:
access a database comprising a plurality of molecular graphs associated with a plurality of molecules and a plurality of labels indicative of chemical properties of the plurality of the molecular graphs, wherein each molecular graph of the plurality of molecular graphs comprises a plurality of sink nodes, each sink node of the plurality of sink nodes connected to a plurality of source nodes for passing neural messages through a plurality of connecting edges;
update hidden states of the plurality of nodes of each molecular graph by aggregating encoded neural messages from the plurality of sink nodes associated with each molecular graph to transform a hidden representation of each sink node among the plurality of sink nodes in a plurality of iterations, wherein to transform the hidden state of a sink node from amongst the plurality of sink nodes in a current iteration from amongst the plurality of iterations, the one or more hardware processors are configured by the instructions to:
determine a first key matrix representative of a plurality of edge-incorporated neural messages sent by the plurality of source nodes to the sink node in a set of previous iterations that occurred prior to the current iteration;
determine a first value matrix representative of the plurality of edge-incorporated neural messages sent by the plurality of source nodes to the sink node in the set of previous iterations;
determine a first query matrix representative of a linearly transformed hidden state of the sink node;
determine a first set of self-attention coefficients to give weightage to the plurality of edge-incorporated neural messages sent from the plurality of source nodes, the first set of self-attention coefficients determined as a softmax transform product of the first query matrix and the first key matrix;
calculate a single message vector to be perceived by the sink node based on a matrix multiplication of the first value matrix and the first set of self-attention coefficients, wherein the single message vector determines the hidden state of the sink node in a next iteration occurring subsequent to the current iteration;
determine a second key matrix representative of the hidden state of the sink node in the set of previous iterations;
determining a second value matrix representative of the hidden state of the sink node in the set of previous iterations;
determine a second query matrix as a product of the hidden state of the sink node determined at each of the plurality of previous iterations and a query projection matrix at the current iteration step;
determine a second set of self-attention coefficients to give weightage to the hidden state of the sink node determined at each of the plurality of previous iterations, the second set of self-attention coefficients determined as a softmax transform product of the second query matrix and the second key matrix;
calculate a self-attention based transformed hidden state of the sink node based on a product of the second set of self-attention coefficients with the second value matrix;
determine the hidden state of the sink node at the current iteration using the single message vector and the self-attention based transformed hidden state of the sink node; and
transform the hidden state vector of the sink node to obtain a graph level embedding of the molecular graph; and
determine one or more molecular properties using a linear layer from the graph level embedding of the molecular graph.

8. The system of claim 7, wherein the first key matrix is determined by computing a transpose of a product of a key projection matrix and a sum of a concatenated matrix of the source node hidden states from the set of previous iterations and the linearly transformed edge-information, wherein the linearly transformed edge-information is obtained by parameterizing edge-information with a first trainable weight matrix.

9. The system of claim 8, wherein the second key matrix is determined by a transpose of a product of the key projection matrix at the current iteration and a concatenated matrix of the sink node hidden states from the set of previous iterations.

10. The system of claim 7, wherein the first value matrix is determined by computing a transpose of a product of a value projection matrix and a sum of a concatenated matrix of the source node hidden states from the set of previous iterations and the linearly transformed edge-information, wherein the linearly transformed edge-information is obtained by parameterizing edge-information with a second trainable weight matrix.

11. The system of claim 10, wherein the second value matrix is determined by the product of (1) the value projection matrix at the current iteration, and (2) a sum of a concatenated matrix of the sink node hidden states from the set of previous iterations.

12. The system of claim 7, wherein the first query matrix is determined as a product of a query projection matrix at the current iteration and the hidden state of the sink node at a previous iteration from amongst the set of previous iterations.

13. One or more non-transitory machine-readable information storage mediums comprising one or more instructions which when executed by one or more hardware processors cause:

accessing, via one or more hardware processors, a database comprising a plurality of molecular graphs associated with a plurality of molecules and a plurality of labels indicative of chemical properties of the plurality of the molecular graphs, wherein each molecular graph of the plurality of molecular graphs comprises a plurality of sink nodes, each sink node of the plurality of sink nodes connected to a plurality of source nodes for passing neural messages through a plurality of connecting edges;

updating, via the one or more hardware processors, hidden states of the plurality of nodes of each molecular graph from amounts of the plurality of molecular graphs by aggregating encoded neural messages from the plurality of sink nodes associated with each of the molecular graphs to transform a hidden representation of each sink node from amongst the plurality of sink nodes in a plurality of iterations, wherein transforming the hidden state of a sink node from amongst the plurality of sink nodes in a current iteration from amongst the plurality of iterations comprises:

determining a first key matrix representative of a plurality of edge-incorporated neural messages sent by the plurality of source nodes to the sink node in a set of previous iterations that occurred prior to the current iteration;

determining a first value matrix representative of the plurality of edge-incorporated neural messages sent by the plurality of source nodes to the sink node in the set of previous iterations;

determining a first query matrix representative of a linearly transformed hidden state of the sink node;

determining a first set of self-attention coefficients to give weightage to the plurality of edge-incorporated neural messages sent from the plurality of source nodes, the first set of self-attention coefficients determined as a softmax transform product of the first query matrix and the first key matrix;

calculating a single message vector to be perceived by the sink node based on a matrix multiplication of the first value matrix and the first set of self-attention coefficients, wherein the single message vector determines the hidden state of the sink node in a next iteration occurring subsequent to the current iteration;

determining a second key matrix representative of the hidden state of the sink node in the set of previous iterations;

determining a second value matrix representative of the hidden state of the sink node in the set of previous iterations;

determining a second query matrix as a product of the hidden state of the sink node determined at each of the plurality of previous iterations and a query projection matrix at the current iteration step;

determining a second set of self-attention coefficients to give weightage to the hidden state of the sink node determined at each of the plurality of previous iterations, the second set of self-attention coefficients determined as a softmax transform product of the second query matrix and the second key matrix;

calculating a self-attention based transformed hidden state of the sink node based on a product of the second set of self-attention coefficients with the second value matrix;

determining the hidden state of the sink node at the current iteration using the single message vector and the self-attention based transformed hidden state of the sink node; and transforming the hidden state vector of the sink node to obtain a graph level embedding of the molecular graph; and determining, via the one or more hardware processors, one or more molecular properties using a linear layer from the graph level embedding of the molecular graph.

14. The one or more non-transitory machine readable information storage mediums of claim 13, wherein the first key matrix is determined by computing a transpose of a product of a key projection matrix and a sum of concatenated matrix of the source node hidden states from the set of previous iterations and the linearly transformed edge-information, wherein the linearly transformed edge-information is obtained by parameterizing edge-information with a first trainable weight matrix.

15. The one or more non-transitory machine readable information storage mediums of claim 14, wherein the second key matrix is determined by a transpose of a product of the key projection matrix at the current iteration and a concatenated matrix of the sink node hidden states from the set of previous iterations.

16. The one or more non-transitory machine readable information storage mediums of claim 13, wherein the first value matrix is determined by computing a transpose of a product of a value projection matrix and a sum of a concatenated matrix of the source node hidden states from the set of previous iterations and the linearly transformed edge-information, wherein the linearly transformed edge-information is obtained by parameterizing edge-information with a second trainable weight matrix.

17. The one or more non-transitory machine readable information storage mediums of claim 16, wherein the second value matrix is determined by the product of (1) the value projection matrix at the current iteration, and (2) a sum of a concatenated matrix of the sink node hidden states from the set of previous iterations.

18. The one or more non-transitory machine readable information storage mediums of claim 13, wherein the first query matrix is determined as a product of a query projection matrix at the current iteration and the hidden state of the sink node at a previous iteration from amongst the set of previous iterations.

* * * * *